United States Patent
Nada et al.

(10) Patent No.: US 9,570,754 B2
(45) Date of Patent: Feb. 14, 2017

(54) PROCESS FOR PRODUCING ANODE MATERIAL FOR SOLID OXIDE FUEL CELL

(71) Applicant: AGC SEIMI CHEMICAL CO., LTD., Chigasaki-shi (JP)

(72) Inventors: Futoshi Nada, Kanagawa (JP); Takene Hirai, Kanagawa (JP)

(73) Assignee: AGC SEIMI CHEMICAL CO., LTD., Chigasaki (JP)

(*) Notice: Subject to any disclaimer, the term of this patent is extended or adjusted under 35 U.S.C. 154(b) by 80 days.

(21) Appl. No.: 14/607,734

(22) Filed: Jan. 28, 2015

(65) Prior Publication Data

US 2015/0140475 A1    May 21, 2015

Related U.S. Application Data

(63) Continuation of application No. PCT/JP2013/067286, filed on Jun. 24, 2013.

(30) Foreign Application Priority Data

Jul. 31, 2012 (JP) .................................. 2012-170342

(51) Int. Cl.
*H01M 4/86* (2006.01)
*H01M 4/88* (2006.01)
(Continued)

(52) U.S. Cl.
CPC ............ *H01M 4/86* (2013.01); *C01F 17/0043* (2013.01); *C01G 53/04* (2013.01); *H01M 4/8875* (2013.01);
(Continued)

(58) Field of Classification Search
None
See application file for complete search history.

(56) References Cited

U.S. PATENT DOCUMENTS

2004/0009109 A1    1/2004   Akimoto et al.
2008/0166618 A1    7/2008   Larsen et al.
(Continued)

FOREIGN PATENT DOCUMENTS

JP     2004-043216    2/2004
JP     2004-055193    2/2004
(Continued)

OTHER PUBLICATIONS

International Search Report issued in International Application No. PCT/JP2013/067286 dated Aug. 27, 2013.

*Primary Examiner* — Patrick Ryan
*Assistant Examiner* — Christopher Domone
(74) *Attorney, Agent, or Firm* — Oblon, McClelland, Maier & Neustadt, L.L.P.

(57) ABSTRACT

To provide an NiO-GDC composite powder or NiO-SDC composite powder having a uniform composition, which is suitable as an anode material for a solid oxide fuel cell.

A process for producing an anode material for a solid oxide fuel cell, made of a composite powder comprising a composite oxide containing cerium element and gadolinium or samarium element, and oxygen element, and an oxide containing nickel element and oxygen element, which comprises a dissolving step of mixing raw material compounds containing metal elements constituting the above composite powder, at least one organic acid selected from the group consisting of maleic acid, lactic acid and malic acid, and a solvent to obtain a metal elements-containing solution, and a drying/sintering step of drying and sintering the metal elements-containing solution.

19 Claims, 4 Drawing Sheets

(51) Int. Cl.
*H01M 4/90* (2006.01)
*C01G 53/04* (2006.01)
*C01F 17/00* (2006.01)
*H01M 8/12* (2016.01)

(52) U.S. Cl.
CPC ......... *H01M 4/9008* (2013.01); *H01M 4/9033* (2013.01); *C01P 2002/85* (2013.01); *C01P 2004/03* (2013.01); *C01P 2004/62* (2013.01); *C01P 2004/82* (2013.01); *C01P 2006/12* (2013.01); *H01M 2008/1293* (2013.01); *Y02E 60/50* (2013.01); *Y02E 60/525* (2013.01)

(56) References Cited

U.S. PATENT DOCUMENTS

2009/0148742 A1\* 6/2009 Day .................... H01M 4/8657
429/483
2010/0151362 A1\* 6/2010 Sawaki .................... B01J 23/58
429/523

FOREIGN PATENT DOCUMENTS

| JP | 2006-188372 | 7/2006 |
| JP | 2007-335142 | 12/2007 |
| JP | 2008-226531 | 9/2008 |
| JP | 2008226531 | \* 9/2008 |
| JP | 2008-541336 | 11/2008 |
| JP | 2009-140730 | 6/2009 |

\* cited by examiner

PROCESS FOR PRODUCING ANODE MATERIAL FOR SOLID OXIDE FUEL CELL

TECHNICAL FIELD

The present invention relates to a process for producing an anode material for a solid oxide fuel cell wherein the uniformity of constituting elements contained in a composite powder is high.

BACKGROUND ART

A solid oxide fuel cell (SOFC) has attracted attention as clean energy, since SOFC is a fuel cell using a solid electrolyte having oxygen ion conductivity as an electrolyte, whereby an electrochemical reaction to generate electromotive force is an oxidation reaction of hydrogen, and carbon dioxide gas is not generated.

A solid oxide fuel cell usually has a stack structure comprising single cells each comprising a cathode as an oxide, a solid electrolyte and an anode connected by an interconnector. Its operating temperature is usually about 1,000° C., and lowering of the temperature has been attempted and practically employed by various studies, however, it is still a high temperature at a level of at least about 600° C.

As an anode material to constitute an anode, a composite powder (also called as NiO-GDC or NiO-SDC) comprising a NiO powder (NiO phase) and a ceria powder (also called as GDC or SDC) doped with gadolinium or samarium and represented by the formula (I) $Ln_xCe_{1-x}O_{2-\delta}$ (Ln is Gd or Sm) is known as one having an excellent power generation property within the above temperature range.

In general, in the case of an anode comprising GDC or SDC, and NiO, an electron conduction path is formed by an Ni phase formed by the reduction of NiO, an ion conduction path is formed by a GDC phase or an SDC phase, and at 3 type interfaces of the above two phases and a fuel pass for hydrogen, hydrocarbon or the like, an electrode reaction results. Accordingly, in order to improve the electrode property, it is preferred to form a composition in which an NiO phase and a GDC phase or an SDC phase, which are made of the above-mentioned composite powder, are uniformly incorporated (uniform composition) as far as possible at the micro level.

Heretofore, as a method for forming a composite powder (NiO-GDC or NiO-SDC), a method of mechanically mixing an NiO powder and a GDC powder or an SDC powder in a solid state (also called a solid phase method) is widely carried out as the most typical method.

For example, Patent Document 1 discloses an anode for an NiO-ceria type solid oxide fuel cell, and it is described to mix NiO particles, ceria coarse particles having a particle size larger than the NiO particles and ceria fine particles having a particle size smaller than the NiO particles in predetermined proportions to obtain a mixture, whereby the anode material is excellent in gas permeability, and an anode which is excellent in electrode reactivity, conductivity and durability can be formed.

Further, in order to obtain a uniform mixture of particles, a high performance mixer provided with rotating blades to be rotated at a high rate (10,000 rpm) is used. In the case of such a solid phase method, there is a problem such that it is principally difficult to obtain a uniform composition at the micro level, so long as an NiO powder and a ceria powder which are raw material element-containing particles are milled and mixed in solid phase.

Further, Patent Document 2 discloses a process for producing a ceramic powder to be used as an anode material for a solid oxide fuel cell, which comprises a first phase made of nickel oxide (NiO) and a second phase made of ceria doped with a rare earth oxide, and disclosed is a process (also called a complex polymerization method) comprising a step of preparing a raw material liquid containing a metal salt such as Ni (nickel nitrate, cerium nitrate or the like) and a chelating agent having a polymerizable functional group which can chelate a cation such as Ni and a step of forming the raw material liquid into droplets and heating the droplets. In a case where the raw material liquid is heated for polymerization, porous spherical particles are obtained, and in a case where the raw material liquid is not polymerized, hollow particles or laminate particles are formed.

The chelating agent is preferably an oxycarboxylic acid such as citric acid, a polyamine such as ethylenediamine tetraacetic acid or a polyol such as ethylene glycol or propylene glycol.

In the case of this method, the yield is poor, since an intermediate product having a high viscosity is formed by the heat-polymerization, and if a nitrate is used as a raw material, NOx is generated at the time of heating, and thereby an exhaust gas cleaning device is required for carrying out the method on an industrial scale.

Further, according to studies by the present inventors, as shown in the after-mentioned Comparative Example 1, in the case of a citrate method in which a raw material for SDC is simply added in a citric acid aqueous solution, even though a large amount of citric acid is used, the solution becomes a slurry state, and although a mixing state is slightly improved as compared with the solid phase method, there is a problem such that only an insufficient mixing state is realized.

PRIOR ART DOCUMENTS

Patent Documents

Patent Document 1: JP-A-2007-335142
Patent Document 2: JP-A-2006-188372

DISCLOSURE OF INVENTION

Technical Problem

The present inventors have studied and analyzed a conventional solid phase method and an NiO-GDC or NiO-SDC composite powder produced by a complex polymerization method. As a result, they have confirmed that there is a problem such that in the case of such conventional production methods, the NiO phase and the GDC phase or SDC phase are not uniform at the micro (fine) level, and principally, they are not likely to be uniform.

It is an object of the present invention to provide a process for producing a (NiO-GDC or NiO-SDC) composite powder (composite fine particles) having a uniform composition, which is suitable as an anode material for a solid oxide fuel cell.

Solution to Problem

The present inventors have conducted a study extensively in order to accomplish the above object. As a result, they have found that by mixing raw material compounds containing Ni, Ce, and Gd or Sm, an organic acid containing at least one member selected from the group consisting of maleic acid, lactic acid and malic acid, and a solvent to form a metal elements-containing solution in which the metals are dissolved as one kind of a complex compound and spray-drying the metal elements-containing solution in the fine droplets state, an NiO-GDC or NiO-SDC composite powder having a uniform composition at the micro level which cannot be obtained by the conventional method, can be obtained. Thus, the present invention has been accomplished.

The present invention is characterized by having the following features.

[1] A process for producing an anode material for a solid oxide fuel cell, made of a composite powder comprising a composite oxide containing cerium element and gadolinium or samarium element, and oxygen element, and an oxide containing nickel element and oxygen element, which comprises a dissolving step of mixing raw material compounds containing metal elements to constitute the above composite powder, at least one organic acid selected from the group consisting of maleic acid, lactic acid and malic acid, and a solvent to obtain a metal elements-containing solution, and a drying/sintering step of drying and sintering the metal elements-containing solution.

[2] The process for producing an anode material for a solid oxide fuel cell according to the above [1], wherein in the dissolving step, citric acid is further mixed.

[3] The process for producing an anode material for a solid oxide fuel cell according to the above [1] or [2], wherein in the dissolving step, citric acid and malic acid are mixed.

[4] The process for producing an anode material for a solid oxide fuel cell according to any one of the above [1] to [3], wherein in the dissolving step, the number of moles of the organic acid used which is selected from the group consisting of maleic acid, lactic acid and malic acid is from 1 to 5 times to the number of moles of Ni atoms contained in the raw material compounds and from 3 to 10 times to the sum of the number of moles of Ce atoms and the number of moles of Gd or Sm atoms contained in the raw material compounds.

[5] The process for producing an anode material for a solid oxide fuel cell according to any one of the above [2] to [4], wherein in the dissolving step, the amount of citric acid used is from 1 to 2 times to the number of moles of Ni atoms contained in the raw material compounds and/or from 0.3 to 3 times to the number of moles of Ce atoms, Gd atoms or Sm atoms contained in the raw material compounds.

[6] The process for producing an anode material for a solid oxide fuel cell according to any one of the above [1] to [5], wherein in the dissolving step, the solvent is water.

[7] The process for producing an anode material for a solid oxide fuel cell according to any one of the above [1] to [6], wherein the temperature in the dissolving step is from 30 to 100° C.

[8] The process for producing an anode material for a solid oxide fuel cell according to any one of the above [1] to [7], wherein in the drying/sintering step, the metal elements-containing solution is spray-dried to produce a dried composite powder, followed by sintering the dried composite powder at from 750 to 1400° C.

[9] The process for producing an anode material for a solid oxide fuel cell according to any one of the above [1] to [8], wherein the composite powder comprises from 10 to 95 wt % of NiO and from 90 to 5 wt % of a composite oxide represented by the formula (I):

$$Ln_xCe_{1-x}O_{2-\delta} \quad (I)$$

wherein Ln is Gd or Sm, $0<x\leq0.5$, and $0<\delta\leq0.25$.

[10] The process for producing an anode material for a solid oxide fuel cell according to any one of the above [1] to [9], wherein the raw material compounds containing metal elements to constitute the composite oxide are in the form of at least one type selected from the group consisting of a carbonate, a hydroxide and an organic acid salt.

[11] An anode material for a solid oxide fuel cell, which is obtained by the process as defined in any one of the above [1] to [10].

[12] The anode material for a solid oxide fuel cell according to the above [11], which has a mean volume diameter (D50) of from 0.3 to 50 μm.

[13] An anode for a solid oxide fuel cell obtained by using the anode material for a solid oxide fuel cell as defined in the above [11] or [12].

Advantageous Effects of Invention

According to the present invention, a process for producing a novel NiO-GDC or NiO-SDC composite powder having a more uniform composition than one by a conventional solid phase method or a slurry method, can be provided.

By molding a composite powder produced by the production process according to the present invention into electrode shape and firing it, a molded fired product can be suitably used as an anode for a solid oxide fuel cell.

DESCRIPTION OF EMBODIMENTS

Figure 1:
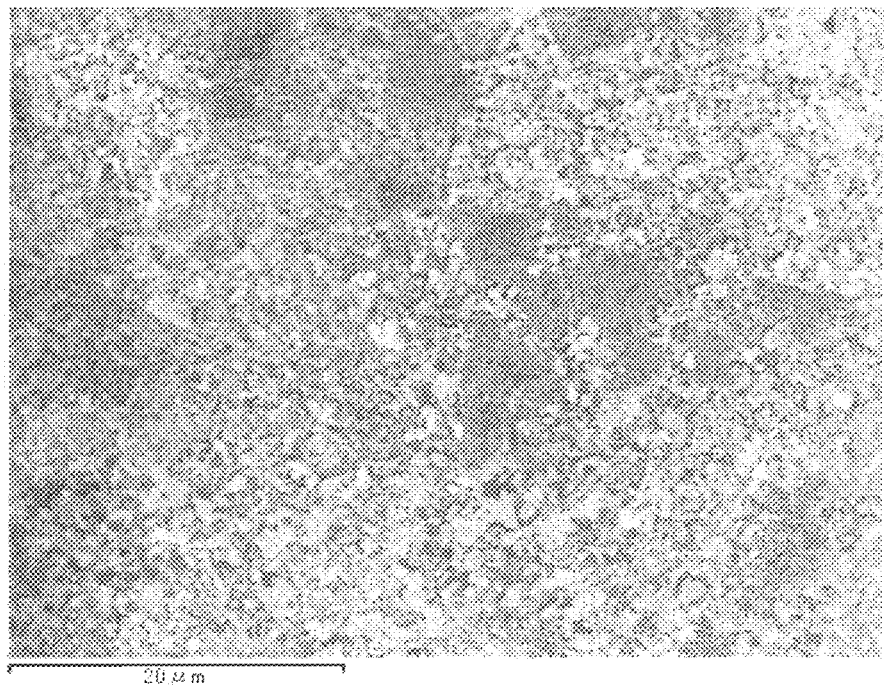
FIG. 1 is an SEM photograph of an NiO-SDC composite powder in Example 1.

The anode material for a solid oxide fuel cell obtained by the production process of the present invention comprises a composite powder containing NiO which is an oxide containing nickel element and oxygen element and a GDC compound (hereinafter referred to also as "GDC") or SDC compound (hereinafter referred to also as "SDC") which is a composite oxide containing cerium element and gadolinium or samarium element, and oxygen element and represented by the formula (I).

$$Ln_xCe_{1-x}O_{2-\delta} \quad (I)$$

In the formula (I), Ln is GD or SM. $0<x\leq0.5$, and $0<\delta<0.25$.

Here, in the formula, the ranges of x and δ being $0<x\leq0.5$ and $0<\delta\leq0.25$, are preferred ranges so as to form a composite oxide wherein a cerium phase doped with gadolinium or samarium has a function as an ion conductive path.

Specifically, as one example of GDC or SDC represented by the formula (I), the following one may be mentioned, however, GDC or SDC is by no means limited to the following example.

$Sm_{0.05}Ce_{0.95}O_{1.975}$ (In the formula (I), Ln=Sm and x=0.05.)

$Gd_{0.1}Ce_{0.9}O_{1.95}$ (In the formula (I), Ln=Gd and x=0.1.)

$Sm_{0.25}Ce_{0.75}O_{1.875}$ (In the formula (I), Ln=Sm and x=0.25.)

$Gd_{0.5}Ce_{0.5}O_{1.75}$ (In the formula (I), Ln=Gd and x=0.5.)

In the composite powder, the proportions of NiO and GDC or SDC are preferably from 10 to 95 wt % of NiO and from 90 to 5 wt % of GDC or SDC, more preferably from 10 to 90 wt % of NiO and from 90 to 10 wt % of GDC or SDC.

Now, the process of the present invention for producing an anode material for a solid oxide fuel cell, made of an NiO-GDC or NiO-SDC composite powder will be further specifically explained.

[Dissolving Step]

(Raw Material Compounds)

As metal element-containing compounds to be raw material compounds for the NiO-GDC or NiO-SDC composite powder (GDC or SDC is represented by the formula $Ln_xCe_{1-x}O_2.\delta$ (I) (wherein Ln is Gd or Sm), the same applies hereinafter)) of the present invention, conventional ones may be suitably used. For example, hydroxides, nitrates, carbonates or organic acid salts such as acetates, which contain Ni, Ln and Ce may be mentioned.

Among them, the raw material compounds are preferably carbonates or hydroxides from the viewpoint of the environment and availability. Further, as such a raw material compound, per one metal element, one type of a compound such as a carbonate, a hydroxide, a nitrate or an organic acid salt such as an acetate may be plurally used, or a compound containing two or more metal elements may be used.

The above raw material compounds are weighed and used so that each element of Ni, Gd or Sm, and Ce would satisfy the desired composition represented by the formula (I) and the desired weight ratio of NiO/GDC or NiO/SDC.

Further, the respective raw material compounds are preferably preliminarily milled to make particles fine, so that the dissolution reaction quickly proceeds. Further, a part or all of the raw material compounds may be preliminary uniformly mixed. Mixing may be carried out by dry mixing, but preferably carried out by a wet mixing method, whereby homogeneous raw material compounds can be obtained in a relatively short time, and particularly milling may be carried out simultaneously with mixing.

An apparatus to carry out the wet mixing method is not particularly limited, and is preferably one which can carry out milling simultaneously. For example, a ball mill, a bead mill, an attrition mill or a colloid mill is preferred. Among them, one which employs a grinding medium such as zirconia balls, for example a ball mill or a bead mill, is more preferably used. For example, the above grinding medium may be added to raw material compounds, followed by milling and mixing using a ball mill for from 12 to 24 hours. It is preferred to carry out milling and mixing by a grinding medium e.g. by using a ball mill, whereby a stronger shear force can be given, and a more homogeneous mixed powder of raw material compounds is obtained.

(Organic Acid)

In the present invention, at least one organic acid selected from the group consisting of maleic acid, lactic acid and malic acid is used. By using such an organic acid, the dissolution reaction with an organic acid (complex formation) will more easily proceed. As the organic acid, it is not necessary to solely use maleic acid, lactic acid or malic acid, and a mixture of maleic acid, lactic acid and malic acid, a mixture of maleic acid and lactic acid, a mixture of maleic acid and malic acid, or a mixture of lactic acid and malic acid, may be used. When at least two organic acids are used in combination, as compared with a case where one type of an organic acid used alone, depending on the combination of organic acids, the dissolution reaction of raw material compounds with organic acids is more proceeded in some cases, or the storage stability of a metal elements-containing solution to be obtained by the dissolution reaction is improved in some cases.

In the present invention, in addition to at least one organic acid selected from the group consisting of maleic acid, lactic acid and malic acid, citric acid is further preferably used in combination. As citric acid, any of citric anhydride, citrate monohydrate and a mixture of citric acid anhydride and citrate monohydrate may be used. By using citric acid in combination, the dissolution reaction of raw material compounds with organic acids is more easily proceeded.

Among them, it is particularly preferred to use citric acid and malic acid in combination. By using citric acid and malic acid in combination, in addition to the effect to accelerate dissolving the raw material compounds, a solution in which the raw material compounds are dissolved is stabilized, and even after expiration of a few days, precipitation of once dissolved raw material compounds can be suppressed.

The amount of at least one organic acid used which is selected from the group consisting of maleic acid, lactic acid and malic acid is preferably at least an amount such that the organic acid is formed into a complex with the metal elements, and the complex can be completely dissolved. Specifically, the number of moles of the organic acid used which is selected from the group consisting of maleic acid, lactic acid and malic acid is preferably from 1 to 5 times to the number of moles of Ni atoms contained in the raw material compounds and from 3 to 10 times to the sum of the number of moles of Ce atoms and the number of moles of Gd or Sm atoms contained in the raw material compounds.

Here, the number of moles of an organic acid used means the sum of the number of moles of an organic acid used for dissolving Ni atoms and the number of moles of an organic acid used for dissolving Ce atoms and Gd or Sm atoms.

The number of moles of an organic acid used is more preferably from 1 to 3 times to the number of moles of Ni atoms contained in the raw material compounds. Further, the number of moles of an organic acid used is more preferably from 3 to 4 times to the sum of the number of moles of Ce atoms and the number of moles of Gd or Sm atoms contained in the raw material compounds. When the amount of an organic acid used is at least the number of moles of Ni atoms and at least 3 times to the sum of the number of moles of Ce atoms and the number of moles of Gd or Sm atoms contained in the raw material compounds, the raw material compounds are dissolved to be a solution in a short time, and even if the number of moles of an organic acid used exceeds 5 times to the number of moles of Ni atoms and 10 times to the sum of the number of moles of Ce atoms and the number of moles of Gd or Sm atoms contained in the raw material compounds, the solubility of the raw material compounds will not change. Further, since it is necessary to burn the organic acid at a subsequent sintering step, the organic acid is preferably the lowest amount required for dissolving the raw material compounds from the viewpoint of improving burning efficiency and reducing $CO_2$.

In a case where the above mentioned citric acid is used in combination, the amount of citric acid used is preferably from 1 to 2 times to the number of moles of Ni atoms contained in the raw material compounds and/or from 0.3 to 3 times to the number of moles of Ce atoms, Gd atoms or Sm atoms. When the amount of citric acid used is from 1 to 2 times to the number of moles of Ni atoms contained in the raw material compounds and/or from 0.3 to 3 times to each number of moles of Ce atoms, Gd atoms or Sm atoms, the raw material compounds are dissolved to be a solution in a short time.

The number of moles of citric acid used is more preferably from 1 to 2 times to the number of moles of Ni atoms contained in the raw material compounds and/or from 0.3 to 1 time to the number of moles of Ce atoms, Gd atoms or Sm atoms.

The molar ratio of the number of moles of the organic acid to the sum of the number of moles of the metal elements contained in the raw material compounds (the number of moles of the organic acid)/(the sum of the number of moles of the metal elements) is preferably from 1.5 to 4.0, more preferably from 1.5 to 3.0.

Further, the ratio of the number of moles of citric acid to the sum of the number of moles of said at least one organic acid selected from the group consisting of maleic acid, lactic acid and malic acid (the number of moles of citric acid)/(the sum of the number of moles of at least one organic acid selected from the group consisting of maleic acid, lactic acid and malic acid) is preferably form 0.2 to 4.0, more preferably from 0.2 to 1.0.

(Dissolution Reaction)

A method for mixing raw material compounds containing metal elements to constitute the composite powder, at least one organic acid selected from the group consisting of maleic acid, lactic acid and malic acid and a solvent to obtain a metal elements-containing solution is not particularly restricted, so long as a metal elements-containing solution can be obtained. However, the following mixing methods 1 to 3 may be mentioned.

Mixing method 1: A method of mixing solid raw material compounds containing metal elements to constitute a composite powder, and a solvent to prepare a slurry, followed by mixing a solid organic acid for dissolution.

Mixing method 2: A method of dissolving an organic acid in a solvent to prepare an organic acid solution, followed by mixing solid raw material compounds to the organic acid solution for dissolution.

Mixing method 3: A method of mixing solid raw material compounds containing metal elements to constitute a composite powder and a solvent to prepare a slurry, dissolving an organic acid in a solvent to prepare an organic acid solution and mixing the organic acid solution with the slurry for dissolution.

The temperature in the dissolving step is preferably under heating for accelerating the dissolution reaction. The temperature is usually from 30 to 100° C., preferably from 50 to 80° C. Further, the reaction time, namely time until a uniform solution is formed, varies depending on the temperature, the amount of an organic acid used, the particle size of the raw material compounds, etc., however, the time is usually from 10 minutes to 10 hours, preferably from 30 minutes to 5 hours, further preferably from about 1 to 3 hours.

The solvent in the dissolving step is not particularly restricted, so long as it is capable of dissolving the organic acid which is a solute. However, water is preferred, since handling and post treatment are easy. In addition to water, in order to stabilize the complex solution, a polyhydric alcohol, an alcohol, a ketone or the like may be added.

Among the dissolving methods, the above mixing method 1 is preferred, whereby a facility for mass production may be small. A specific method of the mixing method 1 may, for example, be a method of adding weighed raw material compounds to water which is a solvent, dispersing them to prepare a raw material slurry aqueous solution, adding a predetermined amount of an organic acid to the raw material slurry aqueous solution, followed by heating to react the raw material compounds with the organic acid to obtain an organic acid aqueous solution in which the raw material compounds are dissolved.

Further, in order to avoid inclusion of impurities in NiO-GDC or NiO-SDC to be produced as far as possible, pure water is particularly preferred. Further, the concentration of the organic acid in the organic acid solution is not particularly restricted, however, from the viewpoint of the easiness of handling and obtaining a sufficiently high reaction rate, the concentration is preferably from 5 to 70 wt %, further preferably from 5 to 60 wt %.

An apparatus to carry out the dissolution reaction is not particularly limited, and for example, a tank reactor equipped with a stirring means, a heating means, a raw material compound-supplying means and an organic acid solution-supplying means, capable of making supplied raw material compounds float without precipitating them and of allowing the raw material compounds to react with the organic acid in a floating state, is preferred. As the stirring means, a conventional stirring machine, for example, any of a paddle agitator, a marine propeller stirrer and a turbine impeller mixer may suitably be used. In the case of a small-scale reaction, a flask-shaped container provided with a stirrer may be used.

The method of contacting the metal element-containing compounds with the organic acid solution is not particularly limited so long as the reaction will efficiently be carried out and finally a uniform solution can be obtained, since the reaction is understood as a solid-liquid different phase reaction from the viewpoint of chemical engineering. Usually, preferred is a method in which the raw material slurry solution is charged in a reactor at first, and the organic acid is added thereto with stirring and reacted.

The raw material compounds to be added may successively be added, or the raw material compounds may preliminarily be mixed and the mixed raw material compounds are supplied all at once and reacted. Otherwise, such supply methods may be combined.

In a case where the raw material powders are successively added, first, a raw material compound containing one metal element e.g. cerium carbonate and samarium carbonate may be supplied to an organic acid solution, reacted and dissolved with heating, and then the remaining raw material compounds (e.g. nickel carbonate) are added and reacted.

Further, a raw material compound containing cerium element, a raw material compound containing gadolinium element or samarium element and a raw material compound containing nickel element may be separately dissolved, followed by mixing the organic acid solutions, or an organic acid solution in which optional two types of raw material compounds selected from the group consisting of a raw material compound containing cerium element, a raw material compound containing gadolinium element or samarium element and a raw material compound containing nickel element, and an organic acid solution in which the remaining one type of a raw material compound may be separately prepared, followed by mixing these two types of organic acid solutions.

For example, an organic acid is added to a slurry of cerium carbonate, and reacted and dissolved with heating to prepare a solution in which cerium carbonate is dissolved. Then, separately from the organic acid solution, an organic acid is added in a slurry of samarium carbonate and nickel carbonate, and reacted with heating to prepare a solution in which samarium carbonate and nickel carbonate are dissolved, followed by mixing it with the organic acid solution in which cerium carbonate is dissolved.

[Drying and Sintering Step]

(Spray Drying, Etc.)

In the present invention, by the above reaction operation, the raw material compounds are dissolved, and a uniform solution is obtained. Thus, it is preferred to carry out spray drying treatment for drying the solution in which the metal elements are dissolved, in the form of droplets and in a state floating in air stream by using a spray drying apparatus or the like, followed by sintering the dried powder.

That is, a solution in which metal elements of the respective raw material compounds are completely dissolved by a solvent and an organic acid comprising at least one member selected from the group consisting of maleic acid, lactic acid and malic acid, or a mixture containing citric acid and at least one member selected from the group consisting of maleic acid, lactic acid and malic acid, a solvent is supplied to a drying apparatus such as an air stream drying apparatus or a spray drying apparatus and thereby dried.

The solution supplied to the drying apparatus is formed into fine droplets in the apparatus, which form a fluidized bed by heated air for drying, and the droplets are dried in an extremely short time while being transported by the heated air, whereby a dried composite powder is obtainable.

The drying apparatus is particularly preferably a spray drying apparatus, since the most dispersed dried composite powder is thereby obtainable. As an atomizer when a spray dryer is used, one having e.g. a rotating disk, a two-fluid nozzle or a pressure nozzle may suitably be employed, and the temperature of the heated air for drying is preferably from 150 to 300° C. at the inlet and from about 100 to about 150° C. at the outlet.

By such spray drying, the solution in which all the raw material metal elements are dissolved is formed into fine droplets, and from each droplet, moisture is evaporated and removed instantaneously or in a very short time, whereby a dried composite powder (a mixed powder wherein the respective raw material compounds are uniformly mixed and dried) having a solid phase precipitated with a uniform composition in principle at the micro level is obtainable.

(Sintering)

Then, preferably, the dried composite powder which is spray-dried, is transferred to a sintering container and sintered in a furnace. The sintering basically preferably comprises three steps differing in the sintering temperature i.e. crude sintering, temporary sintering and main sintering, but may comprise two steps of crude sintering and main sintering, may comprise two steps of temporary sintering and main sintering, or may comprise one step of main sintering only. The material of the sintering container is not particularly limited, and for example, mullite or cordierite may be mentioned.

Of the furnace, the heat source may be an electric or gas shuttle kiln or in some cases, a roller hearth kiln or a rotary kiln and is not particularly limited.

(Crude Sintering)

In the crude sintering step, an operation of increasing the temperature of the furnace to the desired sintering temperature (300 to 500° C.) at a temperature-raising rate of from 20 to 200° C./h is carried out. By the temperature-raising rate being at least 20° C./h, the productivity is improved, such being preferred. Further, by the temperature-raising rate being at most 200° C./h, chemical changes of the reacting substances at each temperature will sufficiently proceed.

The temperature in crude sintering is preferably from 300 to 500° C., more preferably from 350 to 450° C. By the temperature being at least 300° C., the carbon component is less likely to remain, such being preferred. Further, by the temperature being at most 500° C., the constituting elements are less likely to be segregated, such being preferred.

The time in crude sintering is preferably from 4 to 24 hours, more preferably from 8 to 20 hours. By the time being at least 4 hours, the carbon component is less likely to remain, such being preferred. Further, even if the time exceeds 24 hours, there may be no change in the product, however, the time is preferably at most 24 hours from the viewpoint of the productivity. In this crude sintering, the temperature may be kept constant, for example at 400° C. for 8 hours, or may be raised from 300° C. to 450° C.

The atmosphere in the furnace when crude sintering is carried out is an oxygen-containing atmosphere, and is preferably the air atmosphere (in the air) or an atmosphere having an oxygen concentration of at most 21 vol %. If the oxygen concentration exceeds 21 vol %, the carbon component in the raw material mixed powder will burn and the oxidation reaction partially proceeds, and as a result, the constituting elements in the product may be localized in some cases, and accordingly an atmosphere having an oxygen concentration of at most 21 vol % is preferred.

After crude sintering is carried out for a predetermined time, the temperature is decreased to room temperature. The temperature-decreasing rate is preferably from 100 to 200° C./h. From the viewpoint of the productivity, the temperature-decreasing rate is preferably at least 100° C./h. Further, by the temperature-decreasing rate being at most 200° C./h, the sintering container used is less likely to be broken by thermal shock, such being preferred.

Then, the oxide obtained in the crude sintering step is crushed as the case requires. Crushing is usually carried out by dry crushing using a milling machine such as a cutter mill, a jet mill or an atomizer. The mean volume diameter (D50) after crushing is preferably from 1 to 50 μm, more preferably from 1 to 20 μm.

(Temporary Sintering)

Then, the crude-sintered powder which is crushed is subjected to temporary sintering at a temporary temperature (500 to 800° C.).

In the temporary sintering step, the temperature of the furnace is increased to the desired temporary temperature at a temperature-raising rate of from 50 to 400° C./h, preferably from 50 to 200° C./h. The temperature-raising rate is preferably at least 50° C./h from the viewpoint of the productivity. Further, by the temperature-raising rate being at most 400° C./h, the chemical changes of the reacting substances at each temperature will sufficiently proceed, such being preferred.

The temperature in temporary sintering is preferably from 500 to 800° C., more preferably from 500 to 700° C. By the temperature being at least 500° C., the carbon component is less likely to remain, such being preferred. Further, by the temperature being at most 800° C., the sintered powder is less likely to be excessively sintered, such being preferred.

The sintering time is preferably from 4 to 24 hours, more preferably from 8 to 20 hours. By the sintering time being at least 4 hours, the carbon component is less likely to remain, such being preferred. Further, even if the sintering time exceeds 24 hours, there may be no change in the product, however, the sintering time is preferably at most 24 hours from the viewpoint of the productivity.

The atmosphere in the furnace when temporary sintering is carried out is preferably the same oxygen-containing atmosphere as the atmosphere at the time of crude sintering.

After temporary sintering is carried out for a predetermined time, the temperature is decreased to room temperature. The temperature-decreasing rate is preferably from 100 to 200° C./h. The temperature-decreasing rate is preferably at least 100° C./h, from the viewpoint of the productivity, and the temperature-decreasing rate is preferably at most 200° C./h, whereby the sintering container used is less likely to be broken by thermal shock.

Then, the oxide obtained by temporary sintering is crushed as the case requires in the same manner as after crude sintering. Crushing is usually carried out by dry crushing using a milling machine such as a cutter mill, a jet mill or an atomizer. The mean volume diameter (D50) after crushing is preferably from 1 to 50 μm, more preferably from 1 to 20 μm.

(Main Sintering)

Further, the temporary-sintered powder is preferably subjected to main sintering at the main sintering temperature (750 to 1400° C.).

In the main sintering step, the temperature in the furnace is increased to the desired sintering temperature at a temperature-raising rate of from 50 to 400° C./h, preferably from 50 to 200° C./h. The temperature-raising rate is preferably at least 50° C./h from the viewpoint of the productivity. Further, the temperature-raising rate is preferably at most 400° C./h, whereby the temperature reaches the desired sintering temperature in such a condition that the chemical changes of the reacting substances at each temperature will sufficiently proceed, and the reacting substances are in a uniform state, and accordingly by-products will not form in the sintered product.

The temperature in main sintering is basically preferably from 750 to 1,400° C., more preferably from 800 to 1,300° C., particularly preferably from 800 to 1,200° C. By the temperature being at least 750° C., the sintering sufficiently proceeds, or by the temperature being from at most 1,400° C., segregation tends not to occur, such being preferred. Particularly, if the temperature in main sintering exceeds 1,450° C., Ni element and Ce element components segregate.

The sintering time is preferably from 4 to 24 hours, more preferably from 5 to 20 hours. By the sintering time being at least 4 hours, unreacted substances will not be mixed in the desired composite oxide. Further, even if the sintering time exceeds 24 hours, there may be no change in the product, however, from the viewpoint of the productivity, the sintering time is preferably at most 24 hours.

The atmosphere when main sintering is carried out is preferably the same oxygen-containing atmosphere as crude sintering or temporary sintering.

After main sintering is carried out for a predetermined time, the temperature is decreased to room temperature. The temperature-decreasing rate is preferably from 50 to 200° C./h. From the viewpoint of the productivity, the temperature-decreasing rate is preferably at least 50° C./h. Further, when the temperature-decreasing rate is at most 200° C./h, the sintering container used is less likely to be broken by thermal shock, such being preferred.

Then, the oxide obtained by main sintering is crushed in the same manner as after crude sintering. Crushing is usually carried out by dry crushing using a milling machine such as a cutter mill, a jet mill or an atomizer. The mean volume diameter (D50) of the powder after crushing is preferably from 0.3 to 50 μm, more preferably from 0.3 to 20 μm. Then, as the case requires, the powder may be milled by wet milling to adjust the particle size.

[Anode Molding Step]

(Molded Product, Fired Product)

The composite powder obtained by main sintering as mentioned above is a composite powder in which respective particles of an NiO phase and a GDC or SDC phase are uniform even at the micro level, and the GDC or SDC phase represented by $Ln_xCe_{1-x}O_{2-\delta}$ (I) also forms a uniform composite oxide.

In the present invention, the composite powder is molded into a shape of an electrode and fired, and the molded fired product may suitably be used as an anode for a solid oxide fuel cell. That is, it is understood that the molded fired product takes over the uniform composition of the composite powder as it is, and an NiO-GDC sintered product or an NiO-SDC sintered product having a uniform composition in principle is thereby formed.

As means to form the molded product and the fired product, known means are employed. For example, an NiO-GDC composite powder or an NiO-SDC composite powder is mixed with a binder, the mixture is filled in a mold having a certain volume, and pressure is applied to prepare a molded product of the powder.

The method to apply pressure may be mechanical uniaxial press or cold isotactic press (CIP) or the like and is not particularly limited.

Then, the molded product is fired to obtain a fired product to be used as an anode. The sintering temperature is preferably from 1,100 to 1,450° C., more preferably 1,200 to 1,400° C. When the sintering temperature is at least 1,100° C., mechanical strength of the molded product will sufficiently be maintained, and when the sintering temperature is at most 1,450° C., it is unlikely that a part of the formed NiO-GDC or NiO-SDC is decomposed to form impurities, thus leading to non-uniformity of the composition. The sintering time is preferably from 2 to 24 hours, more preferably from 2 to 6 hours.

On the other hand, instead of molding the composite fine particles to a molded product as described above, it is possible to obtain a molded product to be suitably used as an anode by blending the composite powder with an binder to prepare a coating slurry, and applying the coating slurry on a surface of a solid electrolyte and sintering it similarly.

EXAMPLES

Now, the present invention will be described with reference to comparison between Examples of the present invention (Examples 1 to 10) and a Comparative Example (Comparative Example 1). However, it should be understood that such Examples are merely examples of the embodiments of the present invention, and the present invention is by no means restricted to such specific Examples.

In the following, "%" means "weight %" unless otherwise specified.

Example 1

(1) Preparation and Dispersion of Raw Material Compounds

Respective raw material powders were weighed to form $NiO/Sm_{0.2}Ce_{0.8}O_{1.9}$ (NiO/SDC=(25 wt %/75 wt %)).

That is, as shown in Table 1, 197.2 g of hydrous nickel carbonate ($NiCO_3$) (Ni content: 29.88%) as an Ni source, 352.7 g of cerium carbonate ($Ce_2(CO_3)_3.8H_2O$) (Ce content: 41.44%) as a Ce source and 70.6 g of samarium carbonate ($Sm_2(CO_3)_3.nH_2O$) (Sm content: 55.57%) as an Sm source (Sm:Ce of 0.2:0.8 by the atomic ratio) were weighted.

Then, 1.1 L of pure water was added to a 10 L (liter) separable flask provided with a thermostat and a stirrer, and the weighed hydrous nickel carbonate, cerium carbonate and samarium carbonate were added thereto and dispersed under stirring at room temperature.

(2) Intermediate Product and Drying

To the above raw material slurry aqueous solution, 525 g of malic acid as the sum of 3 times to the number of moles of Ce atoms and 3 times to the number of moles of Sm atoms contained in the raw material compounds was added, and 418 g of citric acid monohydrate as the sum of 4/3 times to the number of moles of Ni atoms, 0.5 time to the number of Ce atoms and 0.5 time to the number of moles of Sm atoms contained in the raw material compounds was added, followed by heating to 55° C., and at 55° C., they were reacted for 2 hours. After 2 hours, the respective metal salts were completely dissolved, and a pale green transparent solution was obtained.

The sum of the number of moles of Ni, Ce and Sm which are metal elements contained in the mixture of the raw material compounds was 2.31 mol, and the sum of the number of moles of malic acid (3.92 mol) and citric acid (1.99 mol) used for dissolving the metal element compounds was 5.91 mol. The (the sum of the number of moles of the organic acids)/(the sum of the number of moles of the metal elements) was 2.56, and the (the number of moles of citric acid)/(the number of moles of malic acid) was 0.51.

After completion of the reaction, the obtained solution was dried by a spray dryer to obtain a dried composite powder of a composite organic acid salt as an intermediate product. Here, as the spray dryer, BDP-10 spray bag dryer (manufactured by Ohkawara Kakohki Co., Ltd.) was used, and drying was carried out under conditions of an inlet temperature of 200° C., an outlet temperature of 125° C. and an atomizer rotating speed of 15,000 rpm.

Further, a metal elements-containing solution separately prepared by dissolving the mixture of citric acid monohydrate and malic acid in a slurry wherein a raw material powder containing hydrous nickel carbonate, cerium carbonate and samarium carbonate was dispersed in water as the solvent, was left at room temperature for 3 days. After passing 3 days, precipitates were not observed in the metal elements-containing solution in which the above raw material powder was dissolved, and the metal elements-containing solution was stable as a solution.

(3) Crude Sintering, Temporary Sintering and Main Sintering

The composite dried powder was filled in one piece of 30 cm square mullite and sintered in the air in an electric furnace at 400° C. for 10 hours to decompose the organic substances (crude sintering). The temperature-raising rate from room temperature to 400° C. was 130° C./h, the temperature-decreasing rate from 400° C. to room temperature was 100° C./h, and a crude-sintered powder was obtained.

The obtained crude-sintered powder was filled in one piece of 30 cm square mullite and sintered in the air in an electric furnace at 600° C. for 10 hours to decompose remaining carbon (temporary firing). The temperature-raising rate from room temperature to 500° C. was 170° C./h, the temperature-raising rate to 600° C. was 50° C./h, and the temperature-decreasing rate from 600° C. to room temperature was 100° C./h, and a temporary-sintered powder was obtained.

The temporary-sintered powder was filled in one 30 cm square mullite crucible and sintered in the air in an electric furnace at 1,000° C. for 6 hours to obtain the desired NiO/SDC sintered composite powder ($NiO/Sm_{0.2}Ce_{0.8}O_{1.9}$ (NiO/SDC=25 wt %/75 wt %)) (main sintering). The temperature-raising rate from room temperature to 700° C. was 180° C./h, the temperature-raising rate to 1,000° C. was 100° C./h, and the temperature-decreasing rate from 1,000° C. to room temperature was 100° C./h.

(4) Milling 120 g of the obtained sintered composite powder was milled by a ball mill for 25 hours to obtain a milled powder. Further, the ball mill had a pot volume of 1 L, a zirconia ball (5 mmΦ×1,500 g) was used as a milling media, and 140 mL of AK225-AE (manufactured by Asahi Glass Company, Limited) was used as a milling solvent. The obtained powder had BET of 11 $m^2/g$ and a mean volume diameter (D50) of 0.38 μm.

(5) Component Analysis (SEM and EDX Analysis)

The milled powder was analyzed by a scanning electron microscope (SEM) and an energy dispersive X-ray spectrometer (EDX) attached thereto. The SEM used was FE-SEM S-4300 manufactured by Hitachi, Ltd., and the EDX detector was EDX EMAX6853-H manufactured by HORIBA, Ltd., resolution: 137 eV. Further, measurement was carried out under conditions of an accelerating voltage of 20 kV, an emission current of 20 μA, a magnification of 5,000-hold, WD of 15 mm, a process time of 4 and a count of at least 4,000,000.

Figure 2:
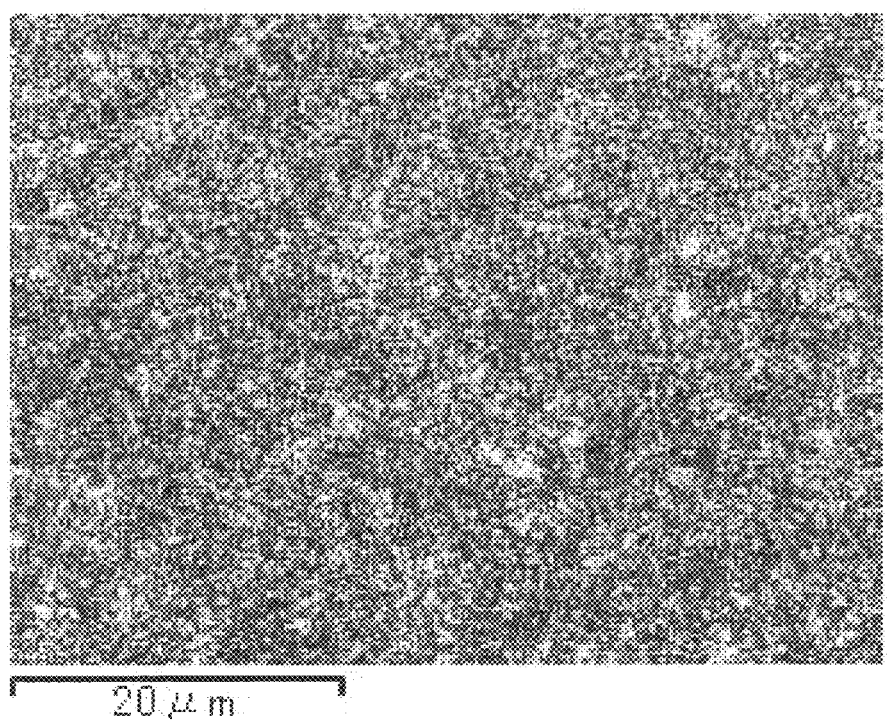
FIG. 2 is an EDX mapping of Ni in Example 1.
Figure 3:
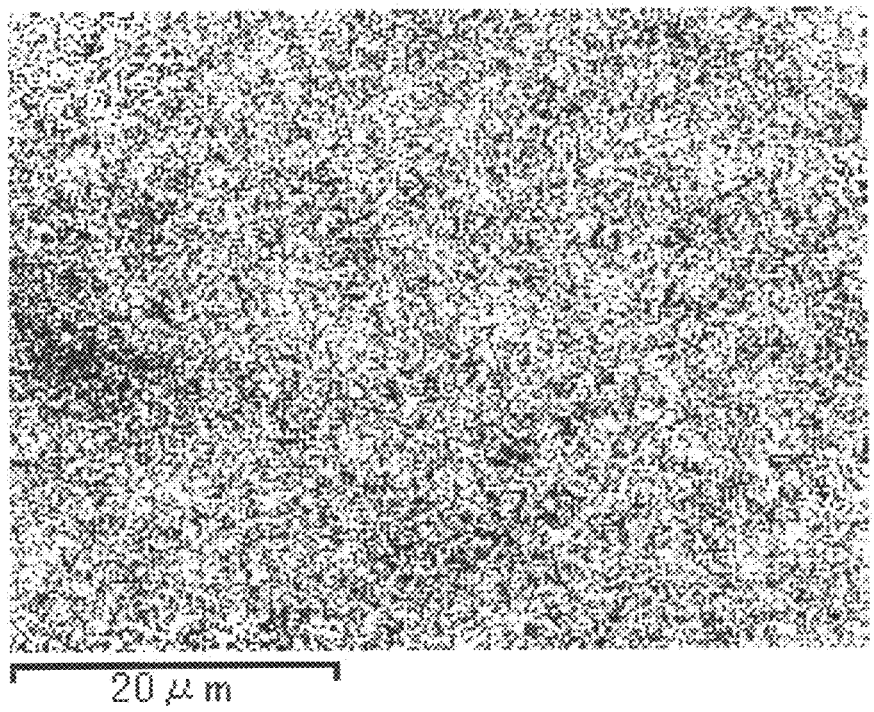
FIG. 3 is an EDX mapping of Ce in Example 1.
Figure 4:
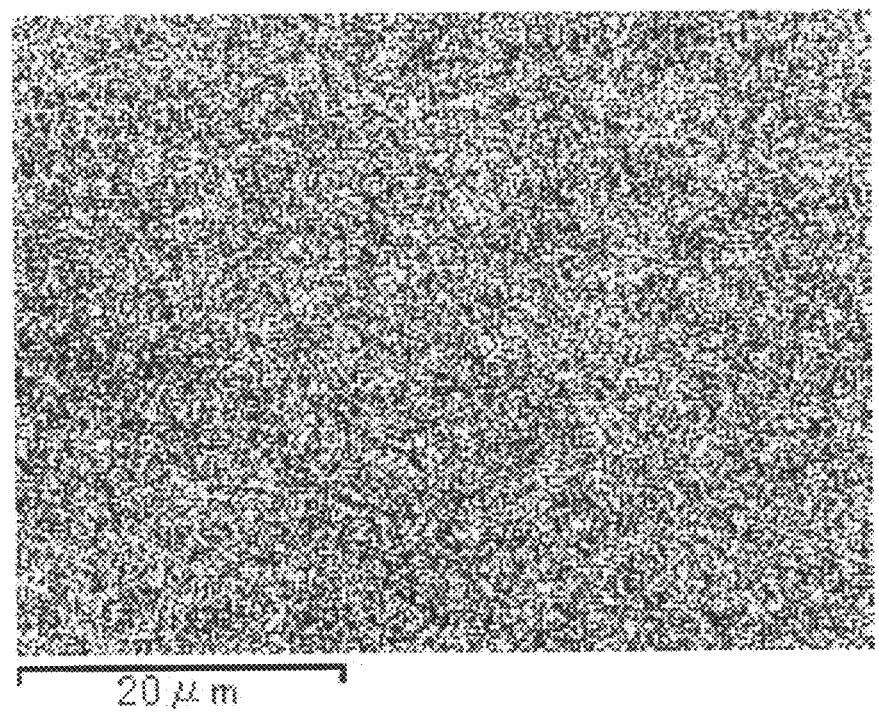
FIG. 4 is an EDX mapping of Sm in Example 1.

FIG. 1 is an SEM photograph (5,000-hold magnification) of the powder. FIGS. 2 to 4 are EDX mappings of Ni, Ce and Sm. It is evident from these mappings that Ni, Ce and Sm in the NiO-SDC prepared by the above complete dissolving method were uniformly dispersed, as compared with Ni, Ce and Sm in the NiO-SDC prepared by a mixing method described in the after mentioned Comparative Example 1.

Example 2

Respective raw material powders were weighed to form $NiO/Sm_{0.2}Ce_{0.8}O_{1.9}$ (NiO/SDC=(25 wt %/75 wt %)).

That is, as shown in Table 1, 197.2 g of hydrous nickel carbonate ($NiCO_3$) (Ni content: 29.88%) as an Ni source, 352.7 g of cerium carbonate ($Ce_2(CO_3)_3 \cdot 8H_2O$) (Ce content: 41.44%) as a Ce source and 70.6 g of samarium carbonate ($Sm_2(CO_3)_3 \cdot nH_2O$) (Sm content: 55.57%) as an Sm source (Sm:Ce:Mn of 0.2:0.8 by the atomic ratio) were weighted.

Then, 6.0 L of pure water was added to a 10 L (liter) separable flask provided with a thermostat and a stirrer, and the weighed hydrous nickel carbonate, cerium carbonate and samarium carbonate were added thereto and dispersed under stirring at room temperature.

To the above raw material slurry aqueous solution, 629 g of maleic acid as the sum of 3 times to the number of moles of Ce atoms, 3 times to the number of moles of Sm atoms and 1.5 times to the number of moles of Ni atoms contained in the raw material compounds and was added, followed by heating to 75° C., and at 75° C., they were reacted for 2 hours. After 2 hours, the respective metal salts were completely dissolved, and a pale green transparent solution was obtained. The subsequent steps were carried out in the same manner as in Example 1 except that the sintering temperature in the main sintering was 800° C., to obtain a composite powder represented by ($NiO/Sm_{0.2}Ce_{0.8}O_{1.9}$ (NiO/SDC=25 wt %/75 wt %)).

Here, as the temperature program in the main sintering, the temperature-raising rate from room temperature to 700° C. was 170° C./h, and the temperature-raising rate to 800° C. was 100° C./h. The temperature-decreasing rate from 800° C. to room temperature was 100° C./h.

The obtained composite powder was subjected to SEM-EDX analysis in the same manner as in Example 1. It is evident from mappings of Ni, Ce and Sm by EDX that Ni, Ce and Sm were uniformly dispersed, similarly to Example 1.

Example 3

Respective raw material powders were weighed to form $NiO/Gd_{0.2}Ce_{0.8}O_{1.9}$ (NiO/GDC=(25 wt %/75 wt %)).

That is, as shown in Table 1, 197.2 g of hydrous nickel carbonate ($NiCO_3$) (Ni content: 29.88%) as an Ni source, 349.9 g of cerium carbonate ($Ce_2(CO_3)_3 \cdot 8H_2O$) (Ce content: 41.44%) as a Ce source and 70.1 g of gadolinium carbonate ($Gd_2(CO_3)_3 \cdot nH_2O$) (Gd content: 58.07%) as a Gd source (Gd:Ce of 0.2:0.8 by the atomic ratio) were weighted.

Then, 6.0 L of pure water was added to a 10 L (liter) separable flask provided with a thermostat and a stirrer, and the weighed hydrous nickel carbonate, cerium carbonate and gadolinium carbonate were added thereto and dispersed under stirring at room temperature.

To the above raw material slurry aqueous solution, 722 g of maleic acid as the sum of 3 times to the number of moles of Ce atoms, 3 times to the number of moles of Gd atoms and 1.5 times to the number of moles of Ni atoms contained in the raw material compounds was added, followed by heating to 55° C., and at 55° C., they were reacted for 2 hours. After 2 hours, the respective metal salts were completely dissolved, and a pale green transparent solution was obtained. The subsequent steps were carried out in the same manner as in Example 1 except that the sintering temperature in the main sintering was 1,200° C., to obtain a composite powder represented by ($NiO/Gd_{0.2}Ce_{0.8}O_{1.9}$ (NiO/GDC=25 wt %/75 wt %)).

Here, as the temperature program in the main sintering, the temperature-raising rate from room temperature to 700° C. was 170° C./h, the temperature-raising rate to 1,000° C. was 100° C./h, and the temperature-raising rate to 1,200° C. was 70° C./h. The temperature-decreasing rate from 1,200° C. to room temperature was 100° C./h.

The obtained composite powder was subjected to SEM-EDX analysis in the same manner as in Example 1. It is evident from mappings of Ni, Ce and Gd by EDX that Ni, Ce and Gd were uniformly dispersed.

Example 4

Respective raw material powders were weighed to form $NiO/Sm_{0.2}Ce_{0.8}O_{1.9}$ (NiO/SDC=(25 wt %/75 wt %)).

That is, as shown in Table 1, 197.2 g of hydrous nickel carbonate ($NiCO_3$) (Ni content: 29.88%) as an Ni source, 352.7 g of cerium carbonate ($Ce_2(CO_3)_3 \cdot 8H_2O$) (Ce content: 41.44%) as a Ce source and 70.6 g of samarium carbonate ($Sm_2(CO_3)_3 \cdot nH_2O$) (Sm content: 55.57%) as an Sm source (Sm:Ce of 0.2:0.8 by the atomic ratio) were weighted.

Then, 6.0 L of pure water was added to a 10 L (liter) separable flask provided with a thermostat and a stirrer, and the weighed hydrous nickel carbonate, cerium carbonate and samarium carbonate were added thereto and dispersed under stirring at room temperature.

To the above raw material slurry aqueous solution, 824 g of 90% lactic acid as the sum of 4 times to the number of moles of Ce atoms, 4 times to the number of moles of Sm atoms and 3 times to the number of moles of Ni atoms contained in the raw material compounds was added, followed by heating to 55° C., and at 55° C., they were reacted for 2 hours. After 2 hours, the respective metal salts were completely dissolved, and a pale green transparent solution was obtained. The subsequent steps were carried out in the same manner as in Example 1 to obtain a composite powder represented by ($NiO/Sm_{0.2}Ce_{0.8}O_{1.9}$ (NiO/SDC=25 wt %/75 wt %)).

The obtained composite powder was subjected to SEM-EDX analysis in the same manner as in Example 1. It is evident from mappings of Ni, Ce and Sm by EDX that Ni, Ce and Sm were uniformly dispersed, similarly to Example 1.

Example 5

Respective raw material powders were weighed to form $NiO/Sm_{0.2}Ce_{0.8}O_{1.9}$ (NiO/SDC=(25 wt %/75 wt %)).

That is, as shown in Table 1, 197.2 g of hydrous nickel carbonate ($NiCO_3$) (Ni content: 29.88%) as an Ni source, 352.7 g of cerium carbonate ($Ce_2(CO_3)_3 \cdot 8H_2O$) (Ce content: 41.44%) as a Ce source and 70.6 g of samarium carbonate ($Sm_2(CO_3)_3 \cdot nH_2O$) (Sm content: 55.57%) as an Sm source (Sm:Ce of 0.2:0.8 by the atomic ratio) were weighted.

Then, 6.0 L (liter) of pure water was added to a 10 L separable flask provided with a thermostat and a stirrer, and the weighed cerium carbonate and samarium carbonate were added thereto and dispersed under stirring at room temperature.

To the above raw material slurry aqueous solution, 454 g of maleic acid as the sum of 3 times to the number of moles of Ce atoms and 3 times to the number of moles of Sm atoms contained in the raw material compounds was added, followed by heating to 75° C., and at 75° C., they were reacted for 2 hours. After 2 hours, the respective metal salts were completely dissolved, and a pale yellow transparent solution was obtained.

Further, 2.0 L (liter) of pure water was added to a 10 L (liter) separable flask provided with a thermostat and a stirrer similarly, and the weighed hydrous nickel carbonate was added thereto and dispersed under stirring at room temperature.

To the above raw material slurry aqueous solution, 202 g of malic acid as 1.5 times to the number of moles of Ni atoms contained in the raw material compound was added, followed by heating to 55° C., and at 55° C., they were reacted for 2 hours. After 2 hours, the respective metal salts were completely dissolved, and a pale green transparent solution was obtained. The subsequent steps were carried out in the same manner as in Example 1 except that immediately before drying, the above respective aqueous solutions were mixed to obtain a composite powder represented by (NiO/$Sm_{0.2}Ce_{0.8}O_{1.9}$ (NiO/SDC=25 wt %/75 wt %)).

The obtained composite powder was subjected to SEM-EDX analysis in the same manner as in Example 1. It is evident from mappings of Ni, Ce and Sm by EDX that Ni, Ce and Sm were uniformly dispersed, similarly to Example 1.

Example 6

Respective raw material powders were weighed to form NiO/$Gd_{0.2}Ce_{0.8}O_{1.9}$ (NiO/GDC=(25 wt %/75 wt %)).

That is, as shown in Table 1, 197.2 g of hydrous nickel carbonate ($NiCO_3$) (Ni content: 29.88%) as an Ni source, 349.9 g of cerium carbonate ($Ce_2(CO_3)_3.8H_2O$) (Ce content: 41.44%) as a Ce source and 70.1 g of gadolinium carbonate ($Gd_2(CO_3)_3.nH_2O$) (Gd content: 58.07%) as a Gd source (Gd:Ce of 0.2:0.8 by the atomic ratio) were weighted.

Then, 6.0 L (liter) of pure water was added to a 10 L separable flask provided with a thermostat and a stirrer, and the weighed hydrous nickel carbonate, cerium carbonate and gadolinium carbonate were added thereto and dispersed under stirring at room temperature.

To the above raw material slurry aqueous solution, 347 g of malic acid as the sum of 2 times to the number of moles of Ce atoms and 2 times to the number of moles of Gd atoms contained in the raw material compounds and 259 g of 90% lactic acid as the sum of 2 times to the number of moles of Ce atoms and 2 times to the number of moles of Gd atoms contained in the raw material compounds and 281 g of citric acid monohydrate as 4/3 times to the number of moles of Ni atoms were added, followed by heating to 55° C., and at 55° C., they were reacted for 2 hours. After 2 hours, the respective metal salts were completely dissolved, and a pale green transparent solution was obtained. The subsequent steps were carried out in the same manner as in Example 1 to obtain a composite powder represented by (NiO/$Gd_{0.2}Ce_{0.8}O_{1.9}$ (NiO/GDC=25 wt %/75 wt %)).

The obtained composite powder was subjected to SEM-EDX analysis in the same manner as in Example 1. It is evident from mappings of Ni, Ce and Gd by EDX that Ni, Ce and Gd were uniformly dispersed, similarly to Example 1.

Example 7

Respective raw material powders were weighed to form NiO/$Gd_{0.2}Ce_{0.8}O_{1.9}$ (NiO/GDC=(40 wt %/60 wt %)).

That is, as shown in Table 1, 315.6 g of hydrous nickel carbonate ($NiCO_3$) (Ni content: 29.88%) as an Ni source, 279.9 g of cerium carbonate ($Ce_2(CO_3)_3.8H_2O$) (Ce content: 41.44%) as a Ce source and 56.1 g of gadolinium carbonate ($Gd_2(CO_3)_3.nH_2O$) (Gd content: 58.07%) as a Gd source (Gd:Ce of 0.2:0.8 by the atomic ratio) were weighted.

Then, 1.1 L (liter) of pure water was added to a 10 L separable flask provided with a thermostat and a stirrer, and the weighed hydrous nickel carbonate, cerium carbonate and gadolinium carbonate were added thereto and dispersed under stirring at room temperature.

To the above raw material slurry aqueous solution, 416 g of malic acid as the sum of 3 times to the number of moles of Ce atoms and 3 times to the number of moles of Gd atoms contained in the raw material compounds and 559 g of citric acid monohydrate as the sum of 4/3 times to the number of moles of Ni atoms, 0.5 time to the number of moles of Ce atoms and 0.5 time to the number of moles of Gd atoms contained in the raw material compounds were added, followed by heating to 55° C., and at 55° C., they were reacted for 2 hours. After 2 hours, the respective metal salts were completely dissolved, and a pale green transparent solution was obtained. The subsequent steps were carried out in the same manner as in Example 1 except that the sintering temperature in the main sintering was 1,300° C., to obtain a composite powder represented by (NiO/$Gd_{0.2}Ce_{0.8}O_{1.9}$ (NiO/GDC=40 wt %/60 wt %)).

Here, as the temperature program in the main sintering, the temperature-raising rate from room temperature to 700° C. was 170° C./h, the temperature-raising rate to 1,000° C. was 100° C./h, and the temperature-raising rate to 1,300° C. was 70° C./h. The temperature-decreasing rate from 1,300° C. to room temperature was 100° C./h.

The obtained composite powder was subjected to SEM-EDX analysis in the same manner as in Example 1. It is evident from mappings of Ni, Ce and Gd by EDX that Ni, Ce and Gd were uniformly dispersed, similarly to Example 1.

Further, a metal elements-containing solution separately prepared by dissolving the mixture of citric acid monohydrate and malic acid in a slurry wherein a raw material powder containing hydrous nickel carbonate, cerium carbonate and gadolinium carbonate was dispersed in water as the solvent, was left at room temperature for 3 days. After passing 3 days, precipitates were not observed in the metal elements-containing solution in which the above raw material powder was dissolved, and the metal elements-containing solution was stable as a solution.

Example 8

Respective raw material powders were weighed to form NiO/$Gd_{0.2}Ce_{0.8}O_{1.9}$ (NiO/GDC=(90 wt %/10 wt %)).

That is, as shown in Table 1, 710.1 g of hydrous nickel carbonate ($NiCO_3$) (Ni content: 29.88%) as an Ni source, 46.7 g of cerium carbonate ($Ce_2(CO_3)_3.8H_2O$) (Ce content: 41.44%) as a Ce source and 14.2 g of gadolinium acetate tetrahydrate (Gd($OOCCH_3$)$_3.4H_2O$) (Gd content: 38.21%) as a Gd source (Gd:Ce of 0.2:0.8 by the atomic ratio) were weighted.

Then, 10 L (liter) of pure water was added to a 20 L separable flask provided with a thermostat and a stirrer, and the weighed hydrous nickel carbonate, cerium carbonate and gadolinium acetate tetrahydrate were added thereto and dispersed under stirring at room temperature.

To the above raw material slurry aqueous solution, 690 g of maleic acid as the sum of 3 times to the number of moles of Ce atoms, 3 times to the number of moles of Gd atoms and 1.5 times to the number of moles of Ni atoms contained in the raw material compounds was added, followed by heating to 75° C., and at 75° C., they were reacted for 2 hours. After 2 hours, the respective metal salts were completely dissolved, and a pale green transparent solution was obtained. The subsequent steps were carried out in the same manner as in Example 1 except that the sintering temperature in the main sintering was 800° C., to obtain a composite powder represented by (NiO/Gd$_{0.2}$Ce$_{0.8}$O$_{1.9}$ (NiO/GDC=90 wt %/10 wt %)).

The obtained composite powder was subjected to SEM-EDX analysis in the same manner as in Example 1. It is evident from mappings of Ni, Ce and Gd by EDX that Ni, Ce and Gd were uniformly dispersed, similarly to Example 1.

Example 9

Respective raw material powders were weighed to form NiO/Gd$_{0.1}$Ce$_{0.9}$O$_{1.95}$ (NiO/GDC=(70 wt %/30 wt %)).

That is, as shown in Table 1, 552.3 g of hydrous nickel carbonate (NiCO$_3$) (Ni content: 29.88%) as an Ni source, 158.3 g of cerium carbonate (Ce$_2$(CO$_3$)$_3$.8H$_2$O) (Ce content: 41.44%) as a Ce source and 14.1 g of gadolinium carbonate (Gd$_2$(CO$_3$)$_3$.nH$_2$O) (Gd content: 58.07%) as a Gd source (Gd:Ce of 0.1:0.9 by the atomic ratio) were weighted.

Then, 2 L (liter) of pure water was added to a 10 L separable flask provided with a thermostat and a stirrer, and the weighed cerium carbonate and gadolinium carbonate were added thereto and dispersed under stirring at room temperature.

To the above raw material slurry aqueous solution, 181 g of maleic acid as the sum of 3 times to the number of moles of Ce atoms and 3 times to the number of moles of Gd atoms contained in the raw material compounds was added, and at 75° C., they were reacted for 2 hours. After 2 hours, the respective metal salts were completely dissolved, and a pale yellow transparent solution was obtained.

Then, to the above aqueous solution, 1,182 g of citric acid monohydrate as 2 times to the number of moles of Ni atoms contained in the weighed hydrous nickel carbonate, and the weighed hydrous nickel carbonate were added, followed by heating to 75° C., and at 75° C., they were reacted for 2 hours. After 2 hours, the respective metal salts were completely dissolved, and a pale green transparent solution was obtained. The subsequent steps were carried out in the same manner as in Example 1 except that the sintering temperature in the main sintering was 800° C., to obtain a composite powder represented by (NiO/Gd$_{0.1}$Ce$_{0.9}$O$_{1.95}$ (NiO/GDC=70 wt %/30 wt %)).

The obtained composite powder was subjected to SEM-EDX analysis in the same manner as in Example 1. It is evident from mappings of Ni, Ce and Gd by EDX that Ni, Ce and Gd were uniformly dispersed, similarly to Example 1.

Example 10

Respective raw material powders were weighed to form NiO/Gd$_{0.4}$Ce$_{0.6}$O$_{1.8}$ (NiO/GDC=(25 wt %/75 wt %)).

That is, as shown in Table 1, 95.3 g of nickel hydroxide (Ni(OH)$_2$) (Ni content: 61.82%) as an Ni source, 259.7 g of cerium carbonate (Ce$_2$(CO$_3$)$_3$.8H$_2$O) (Ce content: 41.44%) as a Ce source and 138.7 g of gadolinium carbonate (Gd$_2$(CO$_3$)$_3$.nH$_2$O) (Gd content: 58.07%) as a Gd source (Gd:Ce of 0.4:0.6 by the atomic ratio) were weighted.

Then, 6.0 L (liter) of pure water was added to a 10 L separable flask provided with a thermostat and a stirrer, and the weighed nickel hydroxide, cerium carbonate and gadolinium carbonate were added thereto and dispersed under stirring at room temperature.

To the above raw material slurry aqueous solution, 621 g of maleic acid as the sum of 3 times to the number of moles of Ce atoms, 3 times to the number of moles of Gd atoms and 1.5 times to the number of moles of Ni atoms contained in the raw material compounds was added, followed by heating to 75° C., and at 75° C., they were reacted for 2 hours. After 2 hours, the respective metal salts were completely dissolved, and a pale green transparent solution was obtained. The subsequent steps were carried out in the same manner as in Example 1 except that the sintering temperature in the main sintering was 1,200° C., to obtain a composite powder represented by (NiO/Gd$_{0.4}$Ce$_{0.6}$O$_{1.8}$ (NiO/GDC=25 wt %/75 wt %)).

The obtained composite powder was subjected to SEM-EDX analysis in the same manner as in Example 1. It is evident from mappings of Ni, Ce and Gd by EDX that Ni, Ce and Gd were uniformly dispersed, similarly to Example 1.

Comparative Example 1

(1) Preparation of NiO 2,000 g of hydrous nickel carbonate (NiCO$_3$) (Ni content: 29.88%) was sintered at 800° C. for 10 hours to prepare nickel oxide (NiO).

(2) Milling of NiO 600 g of the obtained NiO powder was milled by a ball mill for 25 hours to obtain a milled powder. Further, the ball mill had a pot volume of 3 L, a zirconia ball (5 mmΦ×1,500 g) was used as a milling media, and 650 mL of AK225-AE (manufactured by Asahi Glass Company, Limited) was used as a milling solvent. The obtained powder had BET of 6.1 m$^2$/g and a mean volume diameter (D50) of 0.22 μm.

(3) Preparation of SDC

As shown in Table 1, 1097.3 g of cerium carbonate (Ce$_2$(CO$_3$)$_3$.8H$_2$O) (Ce content: 41.44%) as a Ce source and 219.5 g of samarium carbonate (Sm$_2$(CO$_3$)$_3$.nH$_2$O) (Sm content: 55.57%) as an Sm source (Sm:Ce of 0.2:0.8 by the atomic ratio) were weighted.

Then, 7 L of pure water was added to a 10 L (liter) separable flask provided with a thermostat and a stirrer, and the weighed hydrous nickel carbonate, cerium carbonate and samarium carbonate were added thereto and dispersed under stirring at room temperature.

To the above raw material slurry aqueous solution, 1,080 g of citric acid monohydrate as the sum of 4/3 times to the number of moles of Ce atoms contained in the raw material compounds and the equivalent mol to the number of moles of Sm atoms was added, followed by heating to 50° C., and at 50° C., they were reacted for 2 hours. Even after completion of the reaction, the mixture was slurry state, and a metal elements-containing solution could not be obtained.

Further, a reaction was carried out in the same manner as in the above, except that excessive 1,421 g of citric acid monohydrate as the sum of 4/3 times to the number of moles of Ce atoms and 3 times to the number of moles of Sm atoms contained in the raw material compounds was used. However, the mixture was slurry state, and a metal elements-containing solution could not be obtained.

(Intermediate Product and Drying)

After completion of the reaction, the obtained slurry was transferred in a vat and dried by a shelf drier set to 110° C. to prepare a dried composite powder of a composite citrate as an intermediate product.

(Crude Sintering, Temporary Sintering and Main Sintering)

The dried composite dried powder was subjected to the crude sintering, the temporary sintering and the main sintering under the same conditions as in Example 1.

(4) Milling of SDC 600 g of the obtained SDC powder was milled by a ball mill for 25 hours to obtain a milled powder. Further, the ball mill had a pot volume of 3 L, a zirconia ball (5 mmΦ5,000 g) was used as a milling media, and 650 mL of AK225-AE (manufactured by Asahi Glass Company, Limited) was used as a milling solvent. The obtained powder had BET of 9.2 $m^2/g$ and a mean volume diameter (D50) of 0.19 μm.

(5) Mixing NiO and SDC

The NiO obtained in (2) and the SDC obtained in (4) were weighed so as to be 25:75 by the weight ratio and mixed by a sample mill for 3 minutes to prepare a mixed powder of NiO and SDC.

(6) Component Analysis (SEM and EDX Analysis)

The obtained mixed powder was subjected to SEM-EDX analysis in the same manner as in Example 1.

Figure 5:
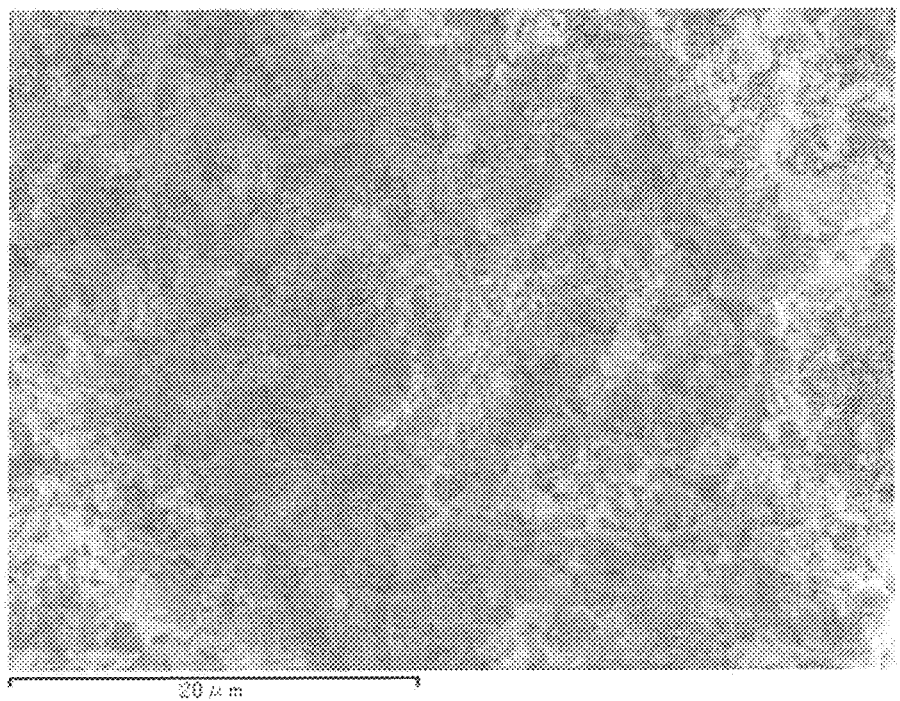
FIG. 5 is an SEM photograph of an NiO-SDC composite powder in Comparative Example 1.
Figure 6:
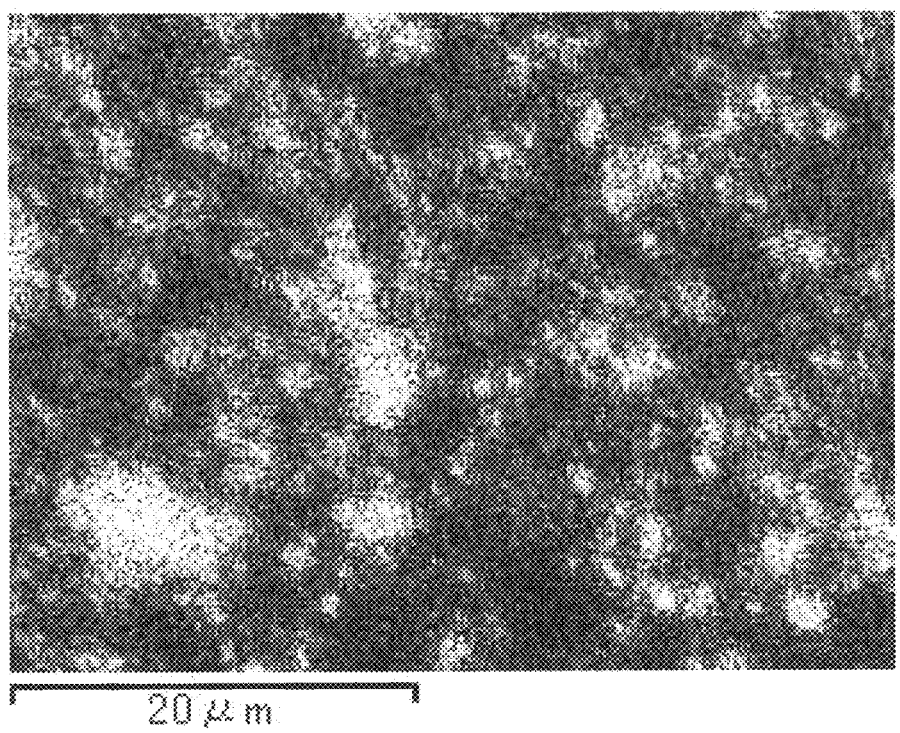
FIG. 6 is an EDX mapping of Ni in Comparative Example 1.
Figure 7:
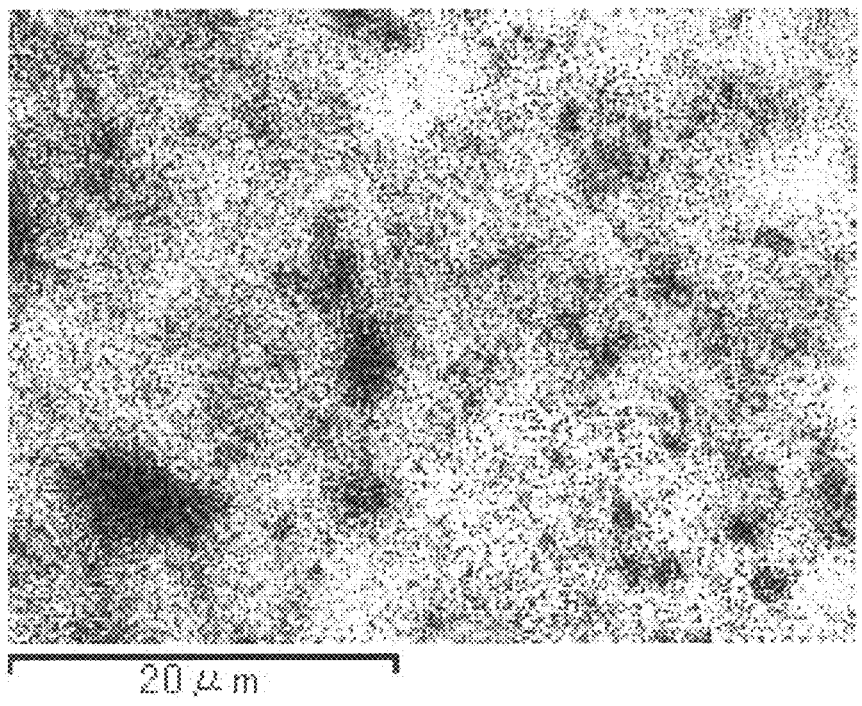
FIG. 7 is an EDX mapping of Ce in Comparative Example 1.
Figure 8:
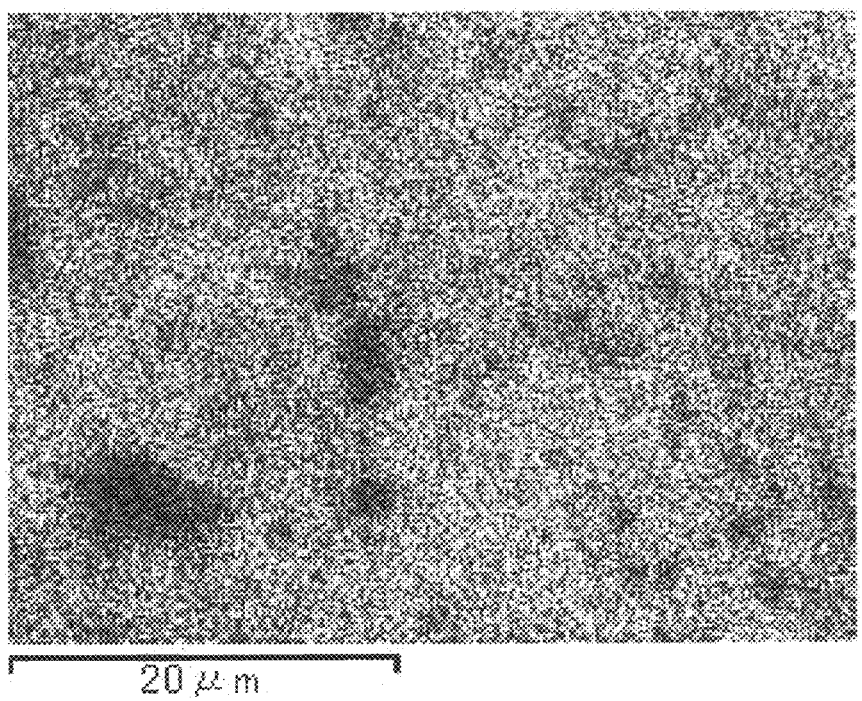
FIG. 8 is an EDX mapping of Sm in Comparative Example 1.

FIG. 5 is an SEM photograph (5,000-hold magnification) of the powder. FIGS. 6 to 8 are EDX mappings of Ni, Ce and Sm. It is evident from these EDX mappings that segregation was observed in each component of Ni, Ce and Sm in the NiO-SDC prepared by the above mixing method, and Ni, Ce and Sm were heterogeneously dispersed.

TABLE 1

| | NiO(%) | GDC/SDC (%) | Amount X of doped Gd/Sm in GDC/SDC | Ni raw material | | | Ce raw material | | |
|---|---|---|---|---|---|---|---|---|---|
| | | | | Type of chemical | Ni content (%) | Weight (g) | Type of chemical | Ce content (%) | Weight (g) |
| Ex. 1 | 25 | 75 | 0.2 | Nickel carbonate | 29.88 | 197.2 | Cerium carbonate | 41.44 | 352.7 |
| Ex. 2 | 25 | 75 | 0.2 | Nickel carbonate | 29.88 | 197.2 | Cerium carbonate | 41.44 | 352.7 |
| Ex. 3 | 25 | 75 | 0.2 | Nickel carbonate | 29.88 | 197.2 | Cerium carbonate | 41.44 | 349.9 |
| Ex. 4 | 25 | 75 | 0.2 | Nickel carbonate | 29.88 | 197.2 | Cerium carbonate | 41.44 | 352.7 |
| Ex. 5 | 25 | 75 | 0.2 | Nickel carbonate | 29.88 | 197.2 | Cerium carbonate | 41.44 | 352.7 |
| Ex. 6 | 25 | 75 | 0.2 | Nickel carbonate | 29.88 | 197.2 | Cerium carbonate | 41.44 | 349.9 |
| Ex. 7 | 40 | 60 | 0.2 | Nickel carbonate | 29.88 | 315.6 | Cerium carbonate | 41.44 | 279.9 |
| Ex. 8 | 90 | 10 | 0.2 | Nickel carbonate | 29.88 | 710.1 | Cerium carbonate | 41.44 | 46.7 |
| Ex. 9 | 70 | 30 | 0.1 | Nickel carbonate | 29.88 | 552.3 | Cerium carbonate | 41.44 | 158.3 |
| Ex. 10 | 25 | 75 | 0.4 | Nickel hydroxide | 61.82 | 95.3 | Cerium carbonate | 41.44 | 259.7 |
| Comp. Ex. 1 | 25 | 75 | 0.2 | Nickel carbonate | 29.88 | 2000 | Cerium carbonate | 41.44 | 1097.3 |

| | Gd/Sm raw material | | | Organic acid | | Main sintering |
|---|---|---|---|---|---|---|
| | Type of chemical | Gd/Sm content (%) | Weight (g) | Type of chemical | Weight (g) | temperature (° C.) |
| Ex. 1 | Samarium carbonate | 55.57 | 70.6 | Malic acid/citric acid | 525/418 | 1000 |
| Ex. 2 | Samarium carbonate | 55.57 | 70.6 | Maleic acid | 629 | 800 |
| Ex. 3 | Gadolinium carbonate | 58.07 | 70.1 | Malic acid | 722 | 1200 |
| Ex. 4 | Samarium carbonate | 55.57 | 70.6 | Lactic acid | 824 | 1000 |
| Ex. 5 | Samarium carbonate | 55.57 | 70.6 | Maleic acid/malic acid | 454/202 | 1000 |
| Ex. 6 | Gadolinium carbonate | 58.07 | 70.1 | Malic acid/lactic acid/citric acid | 347/259/281 | 1000 |
| Ex. 7 | Gadolinium carbonate | 58.07 | 56.1 | Malic acid/citric acid | 416/559 | 1300 |
| Ex. 8 | Gadolinium acetate | 38.21 | 14.2 | Maleic acid | 690 | 800 |
| Ex. 9 | Gadolinium carbonate | 58.07 | 14.1 | Maleic acid/citric acid | 181/1182 | 800 |

TABLE 1-continued

| Ex. 10 | Gadolinium carbonate | 58.07 | 138.7 | Maleic acid | 621 | 1200 |
|---|---|---|---|---|---|---|
| Comp. Ex. 1 | Samarium carbonate | 55.57 | 219.5 | Citric acid | 1080 | 1000 |

INDUSTRIAL APPLICABILITY

As compared with one obtained by a conventional solid phase method or slurry method, the NiO-GDC composite powder or NiO-SDC composite powder obtained by the production process of the present invention has a higher uniform composition, and from a material formed by sintering a molded product of the NiO-GDC composite powder or NiO-SDC composite powder which has such a uniform composition or formed by applying in the form of a layer, the NiO-GDC composite powder or NiO-SDC composite powder on a solid electrolyte, followed by firing, an excellent anode for a solid oxide fuel cell can be formed. Accordingly, the industrial applicability of the present invention is high.

This application is a continuation of PCT Application No. PCT/JP2013/067286 filed on Jun. 24, 2013, which is based upon and claims the benefit of priority from Japanese Patent Application No. 2012-170342 filed on Jul. 31, 2012. The contents of those applications are incorporated herein by reference in their entireties.

What is claimed is:

1. A process for producing an anode material for a solid oxide fuel cell, made of a composite powder comprising a composite oxide containing cerium and at least one of gadolinium and samarium, and oxygen, and an oxide containing nickel and oxygen, which comprises:
    a dissolving step comprising mixing one or more raw material compounds containing the cerium, at least one of the gadolinium and the samarium, the oxygen, and the oxide containing nickel and oxygen of the composite powder, at least one organic acid selected from the group consisting of maleic acid, lactic acid and malic acid, citric acid, and a solvent to obtain a metal elements-containing solution, and
    a drying/sintering step comprising drying and sintering the metal elements-containing solution to form the anode material for a solid oxide fuel cell.

2. The process for producing an anode material for a solid oxide fuel cell according to claim 1, wherein the dissolving step comprises mixing citric acid and malic acid with the raw material compounds.

3. The process for producing an anode material for a solid oxide fuel cell according to claim 1, wherein in the dissolving step, the number of moles of the organic acid selected from the group consisting of maleic acid, lactic acid and malic acid is from 1 to 5 times to the number of moles of Ni atoms contained in the raw material compounds and from 3 to 10 times to the sum of the number of moles of Ce atoms and the number of moles of Gd or Sm atoms contained in the raw material compounds.

4. The process for producing an anode material for a solid oxide fuel cell according to claim 1, wherein in the dissolving step, the amount of citric acid is from 1 to 2 times to the number of moles of Ni atoms contained in the raw material compounds and/or from 0.3 to 3 times to the number of moles of Ce atoms, Gd atoms or Sm atoms contained in the raw material compounds.

5. The process for producing an anode material for a solid oxide fuel cell according to claim 1, wherein in the dissolving step, the solvent is water.

6. The process for producing an anode material for a solid oxide fuel cell according to claim 1, wherein a temperature in the dissolving step is from 30 to 100° C.

7. The process for producing an anode material for a solid oxide fuel cell according to claim 1, wherein in the drying/sintering step, the metal elements-containing solution is spray-dried to produce a dried composite powder, followed by sintering the dried composite powder at from 750 to 1400° C.

8. The process for producing an anode material for a solid oxide fuel cell according to claim 1, wherein the composite powder comprises from 10 to 95 wt % of NiO and from 90 to 5 wt % of a composite oxide represented by the formula (I):

$$Ln_xCe_{1-x}O_{2-\delta} \quad (I)$$

wherein Ln is Gd or Sm, $0<x\leq0.5$, and $0<\delta\leq0.25$.

9. The process for producing an anode material for a solid oxide fuel cell according to claim 1, wherein the raw material compounds are in the form of at least one type selected from the group consisting of a carbonate, a hydroxide and an organic acid salt.

10. An anode material for a solid oxide fuel cell, which is obtained by the process as defined in claim 1.

11. The anode material for a solid oxide fuel cell according to claim 10, which has a mean volume diameter (D50) of from 0.3 to 50 μm.

12. An anode for a solid oxide fuel cell comprising the anode material for a solid oxide fuel cell as defined in claim 10.

13. The process for producing an anode material for a solid oxide fuel cell according to claim 1, wherein the oxide containing nickel and oxygen is at least one of a nickel hydroxide, a nickel carbonate and a nickel organic acid salt.

14. The process for producing an anode material for a solid oxide fuel cell according to claim 1, wherein the oxide containing nickel and oxygen is a nickel carbonate.

15. The process for producing an anode material for a solid oxide fuel cell according to claim 1, wherein the anode material is at least one of NiO-SDC and NiO-SDC.

16. The process for producing an anode material for a solid oxide fuel cell according to claim 1, wherein the anode material is a nickel oxide having a Gd and/or Sm component of the following formula (I):

$$Ln_xCe_{1-x}O_{2-\delta}$$

wherein $0<x\leq0.5$,
$0<\delta\leq0.25$, and
Ln is Gd or Sm.

17. The process for producing an anode material for a solid oxide fuel cell according to claim 1, further comprising:
    after the drying/sintering step, molding the anode material into a shape of an electrode and firing.

18. The process for producing an anode material for a solid oxide fuel cell according to claim 17, wherein the composition of the electrode is uniform.

19. A solid oxide fuel cell comprising:
    an anode made from the anode material for a solid oxide fuel cell of claim 10.

* * * * *